United States Patent
Hong et al.

(10) Patent No.: US 6,775,104 B2
(45) Date of Patent: Aug. 10, 2004

(54) ACTUATOR ARM DAMPER WITH INTEGRATED PRE-AMPLIFIER

(75) Inventors: Yiren Hong, Singapore (SG); CheeWai SeeToh, Singapore (SG); Mo Xu, Singapore (SG); KongBeng Thia, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 308 days.

(21) Appl. No.: 09/892,286

(22) Filed: Jun. 26, 2001

(65) Prior Publication Data

US 2002/0039257 A1 Apr. 4, 2002

Related U.S. Application Data

(60) Provisional application No. 60/235,605, filed on Sep. 27, 2000.

(51) Int. Cl.[7] .............................................. G11B 21/16
(52) U.S. Cl. .................................................... 360/244.1
(58) Field of Search .......................... 360/244.1–244.9, 360/265.1–265.9, 98.07

(56) References Cited

U.S. PATENT DOCUMENTS

| | | | |
|---|---|---|---|
| 5,060,100 A | | 10/1991 | Mihara et al. |
| 5,426,549 A | | 6/1995 | Sakai |
| 5,654,849 A | * | 8/1997 | Hassibi et al. ........... 360/98.07 |
| 5,656,877 A | * | 8/1997 | Loubier |
| 5,883,759 A | | 3/1999 | Schulz |
| 5,949,617 A | | 9/1999 | Zhu |
| 5,956,210 A | * | 9/1999 | Kaneko .................... 360/244.6 |
| 6,005,750 A | | 12/1999 | Willard et al. |
| 6,151,198 A | * | 11/2000 | Prater et al. ............. 360/265.7 |
| 6,278,583 B1 | * | 8/2001 | Adley ....................... 360/244.1 |
| 6,282,062 B1 | * | 8/2001 | Shiraishi ................... 360/244.1 |
| 6,369,985 B1 | * | 4/2002 | Gouo et al. .............. 360/244.1 |
| 6,636,383 B1 | * | 10/2003 | Chew ....................... 360/245.9 |

FOREIGN PATENT DOCUMENTS

EP          0121057 B1    10/1984

* cited by examiner

Primary Examiner—Allen Cao
(74) Attorney, Agent, or Firm—Derek J. Berger

(57) ABSTRACT

There is provided a pre-amplifier with a baseplate configured for mounting to an actuator in a disc drive. The baseplate is directly fixed to the actuator at one point, with a damping layer between a second surface of the baseplate and the actuator. The damping layer helps to constrain the baseplate from rotational movement relative to the actuator. Preferably, the baseplate is fixed to the actuator by a grounding pin coupled to the baseplate.

20 Claims, 3 Drawing Sheets

US 6,775,104 B2

ACTUATOR ARM DAMPER WITH INTEGRATED PRE-AMPLIFIER

RELATED APPLICATIONS

The present application claims benefit of the U.S. provisional patent application No. 60/235,605, filed Sep. 27, 2000.

FIELD OF THE INVENTION

The present invention relates generally to disc drives. More particularly, the present invention relates to the damping of vibrations in a disc drive.

BACKGROUND OF THE INVENTION

In a disc drive, there are generally two significant sources of vibration and noise: the spindle motor with the disc stack is one, and the actuator system is the other. The actuator system includes a voice coil motor, ball bearing, and a suspension-arm assembly. Seek movements of the actuator generates transient and discrete noises which is also known as seek noise. Seek noise is found to be related to the structural resonance of the head-actuator assembly. The seek noise-source level is determined by seek speed, as well as the current profile applied to the voice coil and the head-actuator dynamics. Changing the seek profile and slowing down the seek speed can reduce the levels of seek noise, however, this is at the expense of the performance of the disc drive. A more acceptable alternative is to increase the damping levels of the actuator components and so reduce the resonant behaviour while maintaining the drive performance specifications.

Viscoelastic damping materials are sometimes used to reduce vibration and noise in disc drives. Such methods have found some measure of popularity owing to the development of a wide variety of viscoelastic materials with various useful properties.

For example, some have used viscoelastic materials to dampen vibrations in the actuator system by fabricating the suspension in the form of a laminate. Others have tried cutting holes in the suspension and filling them with damping materials. However, these methods tend to raise manufacturing costs in that more expensive materials are used and manufacturing steps must be added.

What the prior art has been lacking is a damping system design that can be easily and cheaply incorporated into an actuator system, without using additional expensive components or manufacturing processes.

SUMMARY OF THE INVENTION

A disc drive includes at least one disc and at least one head configured for writing data to and reading data from the disc. The head is supported by the suspension, one end of which is attached to an actuator arm. The actuator arm extends from an actuator body, forming part of an actuator. There is provided a pre-amplifier that is operably connected to the head. The pre-amplifier is attached to a first surface of a baseplate that is directly fixed to the actuator at one point, with a damping layer between a second surface of the baseplate and the actuator. Preferably, the baseplate is restrained from rotating relative to the actuator.

These and various other features as well as advantages which characterize the present invention will be apparent upon reading of the following detailed description and review of the associated drawings.

DETAILED DESCRIPTION

Figure 1:
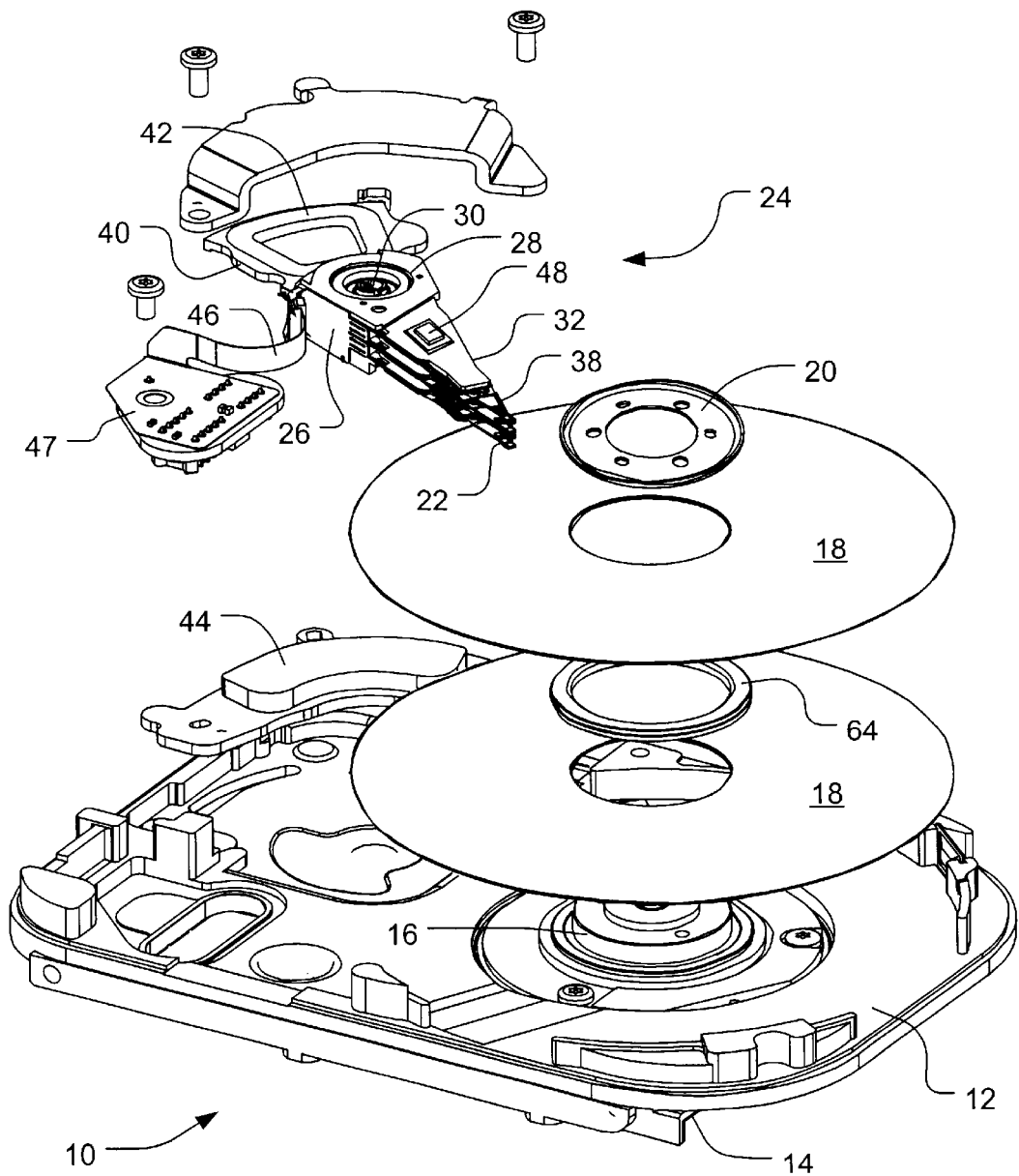
FIG. 1 shows a disc drive.

A preferred embodiment of the present invention will first be described, for the sake of convenience and for exemplary purpose, with respect to a single-header disc drive. It should however be understood that the present invention may be applied to multi-header disc drives, an example of which is shown in FIG. 1. The disc drive 10 has a base 12 to which various components are mounted. Together with a cover (not shown), the base 12 forms an enclosure within which disc drive components can be protected from contamination and from external shocks. Most of the disc drive circuitry is embodied in a printed circuit board assembly 14 attached to the base. Part of this circuitry drives a spindle motor 16 on which a disc 18 is mounted for rotational motion. The disc 18 is secured to the hub of the spindle motor 16 by a disc clamp. During drive operations, information is written to or read from the one surface of the disc by a head 22.

The positioning of the head 22 is controlled by an actuator 24. The actuator 24 includes an actuator body 26 pivotably mounted to the base 12 of the disc drive. The actuator body 26 may include a bore 28. The pivotal mounting may be effected by mounting the sleeve of a pivot cartridge to the bore 28 and fixing the shaft of the pivot cartridge to the base 12. Extending from one side of the actuator body 26 is an actuator arm 32 with a substantially flat cross-section, and thus providing an upper surface 34 and a lower surface 36. The actuator arm 32 may be formed separately from the actuator body 26 and subsequently assembled together, or the actuator arm 32 may be machined or molded as an integral unit with the actuator body 26. Attached to the actuator arm 32, by swaging or other methods, is a suspension 38. The suspension 38 is generally a thin stainless steel strip that is shaped to provide a bias towards the disc surface. The head 22 is supported at one end of the suspension 38.

Extending from the actuator body 26, in a direction generally away from the actuator arm, is a support 40 to which a voice coil 42 is attached. When the actuator 24 is assembled to the base 12 of the disc drive, the voice coil 42 is positioned adjacent to one or more permanent magnets 44. By controllably passing a current through the voice coil 42, a resultant torque causes the actuator 24 to swing about its pivot. In this manner, the head 22 can be positioned at the various desired positions relative to the disc 18.

Wiring is provided from the head 22 to the printed circuit board assembly 14 in the form of flexible printed circuits or cables 46. The flexible printed circuit 46 travels from the head 22, runs along a surface of the suspension 38 and the actuator arm 32, and then extends from the actuator 24 to a connector 47 attachable to the base 12 of the disc drive for operable coupling with the printed circuit board assembly 14. To amplify the data and position signals between the head 22 and the printed circuit board assembly 14, a pre-amplifier 48 is operably connected to the wiring 46.

Figure 2:
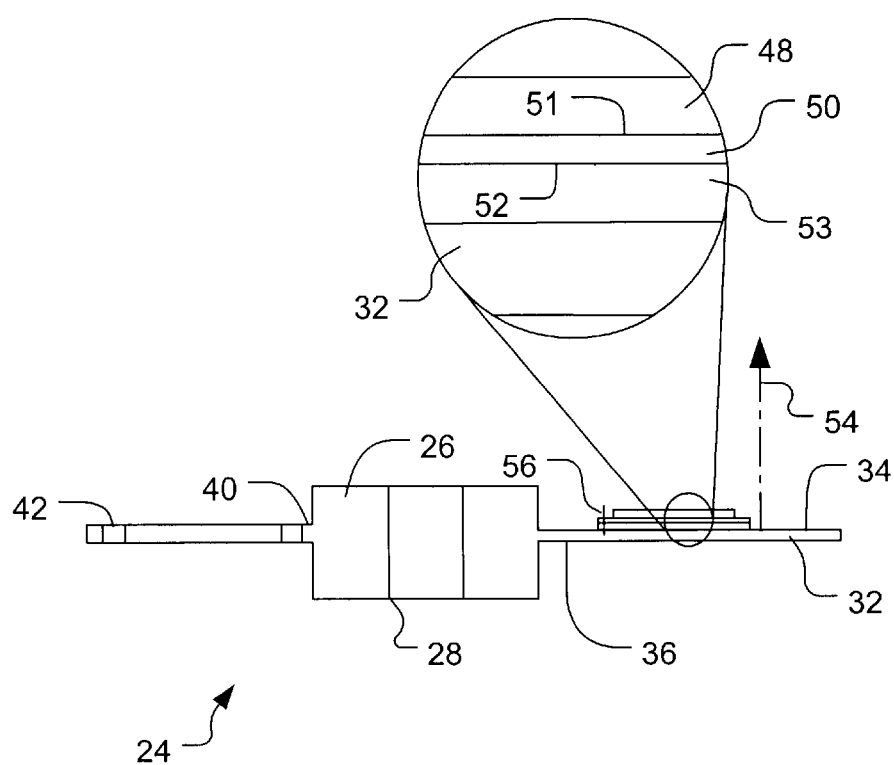
FIG. 2 is a schematic side view of an actuator with a damper of the present invention.

The pre-amplifier 48 is preferably mounted to the upper surface 34 of the actuator arm, as illustrated in FIG. 2. The pre-amplifier 48 is mounted on a first surface 51 of a baseplate 50. The baseplate 50 is a stiff flat piece of material to which the pre-amplifier 48 is rigidly fixed. A second surface 52 of the baseplate 50 is attached to a layer of damping material 53 which is in turn attached to the actuator arm 32. The damping material 53 effectively adheres most, if not all, of the baseplate 50 to the actuator arm 32. Thus, the damping material 53 prevents the baseplate 50 and the pre-amplifier 48 from rotating about a z-axis 54, where the z-axis is defined to be normal to the surface of the actuator arm.

Other than being indirectly attached to actuator arm 32 via the damping material 53, the baseplate 50 itself is directly joined to the actuator arm 32 at only one point. Preferably this is achieved by having a connecting pin 56 from the baseplate 50 to the actuator arm 32. A grounding pin connected to the baseplate 50 may double up as the connecting pin 56. By using a rigid pin 56 soldered at one end to the base plate 50 and at the other end to the actuator arm 32, a single fixed point can be created.

The actuator 24 under vibration creates shearing movement between the baseplate 50 and the actuator arm 32, which in turn results in the damping material 53 undergoing deformation and absorbing the vibration.

It is conceivable that having more than one fixed point between the baseplate 50 and the actuator arm 32 will still allow the damping material 53 to undergo some deformation and produce some damping effect. In a preferred embodiment, however, a single fixed point allows the damping properties of the damping material to be better exploited.

Figure 3:
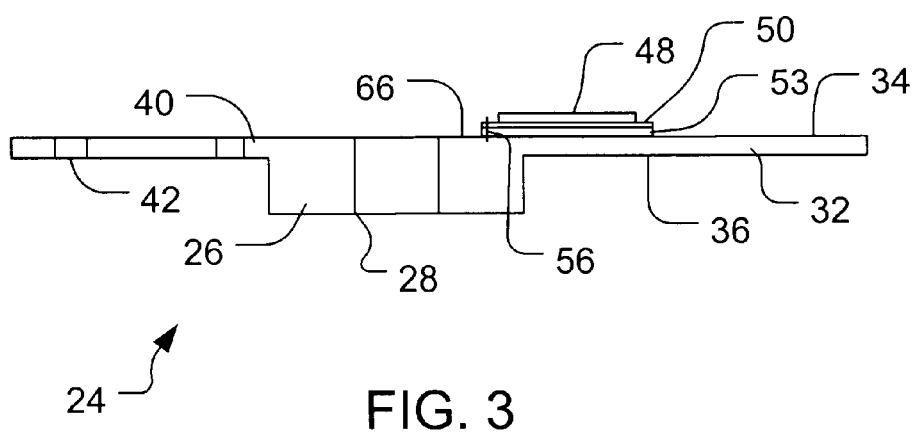
FIG. 3 shows an alternative location of the pre-amplifier.

If the mechanical frequency response function of a conventional actuator system is analyzed, it will be found that the mode related to the actuator arm generally has lower damping than the modes associated with other parts of the actuator. It is therefore preferable that the damping system of the present invention is applied to the actuator arm. However, the boundary between the actuator body and the arm may sometimes be indistinct. FIG. 3 shows an alternative embodiment where the baseplate 50 is positioned partly on the actuator body 26 and partly on what is considered the actuator arm 32. To facilitate mounting, the upper surface 66 of the actuator body and the upper surface 34 of the arm are on the same elevation. The single fixed point may be on the actuator body 26 or on the actuator arm 32.

In another embodiment, the disc drive 10 includes a plurality of discs 18 in a disc stack mounted to the hub of the spindle motor 16. For the purpose of illustration only, an embodiment where the disc drive includes two discs, giving four surfaces formatted for data storage, is considered.

In order to provide at least one head 22 for each disc surface, the actuator 24 is made with three actuator arms. The upper actuator arm 58 and the lower actuator arm 62 each supports one head 22 on a suspension 38. The middle actuator arm 60 supports two suspensions 38, one of which holds a head 22 upwards towards the lower surface of the upper disc and the other holds a head 22 downwards towards the upper surface of the lower disc. The discs 18 are kept spaced apart by the use of a spacer 64 so as to provide room for the heads 22 associated with the middle actuator arm 60 to access the relevant disc surfaces.

Wiring is provided from each head 22 to the printed circuit board assembly 14 in the form of flexible printed circuits or cables 46. The flexible printed circuit 46 travels from the head 22, runs along a surface of the suspension 38 and the along the actuator arm 32, and then extends from the actuator 24 to a connector 47 configured for attachment to the printed circuit board assembly 14. To amplify the data and position signals between the head 22 and the printed circuit board assembly 14, a preamplifier 48 operably connected to the wiring 46 is provided for each actuator arm 32.

Figure 4:
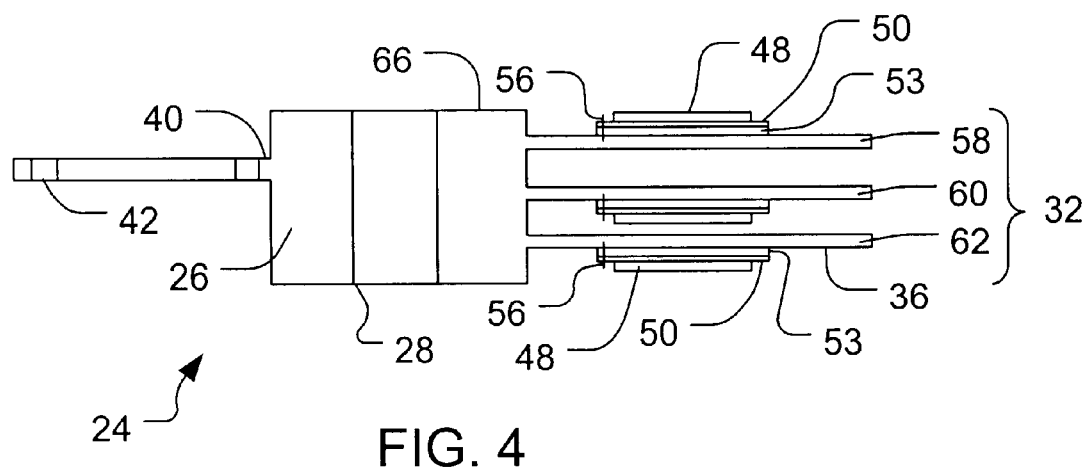
FIG. 4 is a schematic side view of an actuator with more than one actuator arm.

Each pre-amplifier 48 is fixed to a baseplate 50 which is in turn attached to an actuator arm 32. The baseplate 50 can be coupled to an upper surface 24 of an actuator arm or to a lower surface 36 of the actuator arm, as illustrated in FIG. 4. The choice of location may be influenced by the routing design of the wiring. The baseplate 50 is mounted such that it is effectively prevented from rotating relative to the actuator arm 32. At the same time, the baseplate 50 and the actuator arm 32 are configured to share a common fixed point. This can be achieved by having a rigid pin 56 join the baseplate 50 to the actuator arm 32. Preferably a grounding pin 56 is used to effect the one fixed point attachment.

It can be understood from the foregoing how the present invention provides for a cost-effective damping system for use in a disc drive actuator system. One significant advantage is that no additional components are required, other than the application of a damping material.

Alternatively, embodiments of the present invention may be described as follows:

A disc drive 10 includes a disc 18 and a head 22 configured for writing data to and reading data from the disc 18. The head 22 is supported by a suspension 38, one end of which is attached to an actuator arm 32. The actuator arm 32 extends from an actuator body 26, forming part of an actuator 24. There is provided a pre-amplifier 48 that is operably connected to the head 22. The pre-amplifier 48 is attached to a first surface 51 of a baseplate 50. The baseplate 50 is directly fixed to the actuator 24 at one point, with a damping layer 53 between a second surface 52 of the baseplate 50 and the actuator 24. Preferably, the baseplate 50 is restrained from rotating relative to the actuator 24. In one embodiment, the baseplate 50 is fixed to the actuator body 26 at the one point. In another, the baseplate 50 is fixed to the upper surface 34 of the actuator arm 32 at the one point. In yet another embodiment, the baseplate 50 is fixed to the lower surface 36 of the actuator arm 32 at the one point. Preferably, the baseplate 50 is fixed to the actuator 24 at the one point by a grounding pin 56 coupled to the baseplate 50. The damping layer 53 is preferably formed from a viscoelastic material.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts without departing from the scope and spirit of the present invention.

What is claimed is:

1. A disc drive comprising:
   a disc;
   an actuator comprising:
      an actuator body; and
      an actuator arm extending from the actuator body, the actuator arm having an upper surface and a lower surface;
   a suspension with one end attached to the actuator arm;
   a head configured for writing data to and reading data from the disc, the head being supported by the suspension;
   a baseplate with a first surface and a second surface;
   a pre-amplifier operably connected to the head, the pre-amplifier being attached to the first surface of the baseplate; and a damping layer between the second surface of the baseplate and the actuator.

2. The disc drive of claim 1 in which the baseplate is restrained by the damping layer from rotating relative to the actuator.

3. The disc drive of claim 1 in which the baseplate is directly fixed to the actuator at one point.

4. The disc drive of claim 3 in which the baseplate is fixed to the actuator body at the one point.

5. The disc drive of claim 3 in which the baseplate is fixed to the upper surface of the actuator arm at the one point.

6. The disc drive of claim 3 in which the baseplate is fixed to the lower surface of the actuator arm at the one point.

7. The disc drive of claim 3 further comprising:
a grounding pin coupled to the baseplate, the baseplate being fixed to the actuator at the one point by the grounding pin.

8. The disc drive of claim 1 in which the damping layer is a viscoelastic material.

9. An actuator for use in a disc drive, the actuator comprising:
an actuator body;
an actuator arm extending from the actuator body, the actuator arm having an upper surface and a lower surface;
a baseplate with a first surface and a second surface;
a pre-amplifier on the first surface of the baseplate; and
a damping layer between the second surface of the baseplate and the actuator.

10. The actuator of claim 9 in which the baseplate is restrained by the damping layer from rotating relative to the actuator.

11. The actuator of claim 9 in which the baseplate is directly fixed to the actuator at one point.

12. The actuator of claim 11 in which the baseplate is fixed to the actuator body at the one point.

13. The actuator of claim 11 in which the baseplate is fixed to the upper surface of the actuator arm at the one point.

14. The actuator of claim 11 in which the baseplate is fixed to the lower surface of the actuator arm at the one point.

15. The actuator of claim 11 further comprising a grounding pin coupled to the baseplate, the baseplate being fixed to the actuator at the one point by the grounding pin.

16. The actuator of claim 9 in which the damping layer is a viscoelastic material.

17. A disc drive comprising:
an actuator;
a suspension with one end attached to the actuator;
a pre-amplifier; and
means for damping vibrations of the actuator.

18. The disc drive of claim 17, the damping means further comprising:
a viscoelastic material.

19. The disc drive of claim 17 further comprising:
a preamp, the damping means being positioned between the preamp and the actuator.

20. The disc drive of claim 17, the actuator further comprising:
a single actuator arm for carrying a head.

* * * * *